United States Patent
Calvanese Strinati

(10) Patent No.: US 9,094,871 B2
(45) Date of Patent: Jul. 28, 2015

(54) TRAFFIC MANAGEMENT GATEWAY FOR MACHINE-TO-MACHINE NETWORK

(71) Applicant: COMMISSARIAT A L'ENERGIE ATOMIQUE ET AUX ENE ALT, Paris (FR)

(72) Inventor: Emilio Calvanese Strinati, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 108 days.

(21) Appl. No.: 13/933,381

(22) Filed: Jul. 2, 2013

(65) Prior Publication Data
US 2014/0016466 A1 Jan. 16, 2014

(30) Foreign Application Priority Data
Jul. 3, 2012 (FR) ...................................... 12 56349

(51) Int. Cl.
*H04W 28/14* (2009.01)
*H04W 84/02* (2009.01)
*H04W 88/16* (2009.01)
*H04W 28/10* (2009.01)
*H04L 12/863* (2013.01)
*H04L 12/805* (2013.01)

(52) U.S. Cl.
CPC ........... *H04W 28/10* (2013.01); *H04L 47/6215* (2013.01); *H04W 28/14* (2013.01); *H04L 47/365* (2013.01)

(58) Field of Classification Search
None
See application file for complete search history.

(56) References Cited

U.S. PATENT DOCUMENTS

| 2002/0101863 | A1* | 8/2002 | Endo .............................. 370/356 |
| 2008/0159319 | A1* | 7/2008 | Gast et al. ..................... 370/412 |
| 2009/0245091 | A1* | 10/2009 | Lin et al. ........................ 370/210 |
| 2010/0246600 | A1* | 9/2010 | Das et al. ....................... 370/465 |
| 2012/0117140 | A1 | 5/2012 | Wang et al. |
| 2012/0322479 | A1* | 12/2012 | Hakola et al. ................. 455/507 |

(Continued)

FOREIGN PATENT DOCUMENTS

EP 2 466 791 A1 6/2012

OTHER PUBLICATIONS

Vodafone "M2M: Small data transmission using optimised SMS", 3GPP draft, TD S2-112766 SMS, 3rd Generation Partnership Project, May 2011, 6 pages.*

(Continued)

*Primary Examiner* — Omar Ghowrwal
(74) *Attorney, Agent, or Firm* — Oblon, McClelland, Maier & Neustadt, L.L.P.

(57) ABSTRACT

A gateway for interfacing a capillary network of communicating devices with an access point of a cellular network. The gateway includes a plurality of input buffers designed to store elementary packets. A plurality of output buffers store composite packets formed by aggregation of elementary packets, each output buffer being associated with a type of flow of the cellular network. A flow regulator determines for each output buffer, parameters of size and/or transmission times of the composite packets such that the flow of these packets is consistent with the type of flow of the cellular network associated with the output buffer. A multiplexing device transfers and aggregates elementary packets, stored in the input buffers, in the form of composite packets having the parameters determined by the flow regulator. A scheduling device for transmitting the composite packets by the transmission resources of the cellular network.

16 Claims, 3 Drawing Sheets

(56) References Cited

U.S. PATENT DOCUMENTS

| | | |
|---|---|---|
| 2013/0044661 A1* | 2/2013 | Jokimies et al. ............ 370/311 |
| 2013/0136064 A1* | 5/2013 | Jamadagni et al. ........... 370/328 |
| 2013/0316762 A1* | 11/2013 | Charbit et al. ............ 455/552.1 |
| 2014/0016466 A1 | 1/2014 | Calvanese Strinati et al. |
| 2014/0220994 A1 | 8/2014 | Calvanese Strinati et al. |

OTHER PUBLICATIONS

3GPP TS 36.201, Evolved Universal Terrestrial Radio Access (E-UTRA); LTE physical layer; General description (Release 10), v10.0.0, Dec. 2010, pp. 1-13.*

3GPP TR 26.996, Spatial channel model for Multiple Input Multiple Output (MIMO) simulations (Release 10), v10.10.0, Mar. 2011, pp. 1-40.*

3GPP TR 25.892, Feasibility Study for Orthogonal Frequency Division Multiplexing (OFDM) for UTRAN enhancement (Release 6), v6.0.0, Jun. 2004, pp. 1-91.*

Rakesh Arora, Voice over IP: Protocols and Standards, Feb. 7, 2000, pp. 1-20.*

Parviz Yegani, WiMAX Overview, Nov. 2005, IETF-64, pp. 1-22.*

Anders Orrevad, "M2M Traffic Characteristics" Master of Science Thesis, Stockholm, Sweden, KTH Information and Communication Technology, 2009, 55 pages.

"LTE physical layer framework for performance verification" Orange 3GPP TSG-RAN1#48, R1-070674, Feb. 2007, 21 pages.

French Preliminary Search Report issued Mar. 7, 2013 in French 12 56349, filed on Jul. 3, 2012.

* cited by examiner

TRAFFIC MANAGEMENT GATEWAY FOR MACHINE-TO-MACHINE NETWORK

TECHNICAL FIELD

The present invention relates generally to machine-to-machine (M2M) communications systems and more particularly a gateway for a M2M network and a cellular network.

PRIOR ART

Machine-to-machine communications, also called machine-type communications or MTC allow devices such as sensors, counters or detectors to communicate directly to each other and/or with a remote server. A classic example of M2M communication is a network of detectors (break-in, fire) transmitting information to a remote monitoring server.

The different devices (or machines) of a MTC communications system are generally organised in the form of a network, a so-called capillary network, in which the information is routed in the form of packets, from one device to the other by means of multiple hops (multihop). In recent M2M communications systems, the capillary network is connected to a cellular telecommunications system by means of a gateway called a MTC gateway or capillary gateway.

FIG. 1 schematically illustrates architecture of a MTC communications system.

This system comprises a plurality of devices 115, for example sensors, actuators, counters, RFID labels, detectors etc., organised in the form of a capillary network 110. This network is connected to an access point, 135, (for example base station, access terminal, eNode B in a LTE network, etc.) of a cellular communications system 130, by way of a MTC gateway, 120. The devices 115 can transmit data packets (hereinbelow simply called "packets") from a remote applications server (M2M server) 140 via the cellular communications system and the Internet network 150. Where necessary, these devices can also receive data packets over the downlink.

The cellular communications system 130 can be a system of third, or even fourth generation such as a 3GPP LTE (Long-Term Evolution) network or a WiMax network.

It is significant that the LTE network, when deployed, utilises access distribution by sub-carrier intervals (frequency chunks) of an OFDM (Orthogonal Frequency Division Multiplexing) multiplex as well as MIMO (Multiple Input Multiple Output) antenna systems. It will supply high-quality service communications, broadband and low latency. In particular, the LTE network should benefit from broadband mobile services such as mobile video or high-rate mobile Internet.

Inversely, M2M communications are generally sporadic and have low average rates. The traffic characteristics of some M2M communications have been the object of evaluation and modelling in the thesis of A. Oswald, entitled "M2M traffic characteristics", Master of Science Thesis, Stockholm, Sweden 2009. Sensors envisaged in this work are detection sensors for surveillance or water leak sensors. The sensors are for the majority of time in wake mode and transmit only small quantities of data to signal to the rest of the network that they are in proper operating condition. But, as soon as an alarm is triggered or an event occurs, the sensor can send burst data (burst traffic).

Even though the average rate of MTC communication is low, the very large number of M2M devices deployed can result in a situation of congestion at some points of the LTE network and consequently penalise the other communications.

The main aim of the present invention is to ensure compatibility between MTC communications and a 3GPP LTE network, and more generally to interface a capillary network MTC to a cellular network by avoiding the risks of congestion.

A first solution to this problem is to provide several categories of M2M flow, as proposed in application US2012/0117140, and to consider the MTC gateway as a particular case of user equipment or UE (User Equipment) of the cellular network. Yet the large disparity in characteristics of MTC communications, highly dependent on the M2M application in question, makes management of these flows particularly complex.

On the other hand, MTC communications generally have a high degree of recurrence which makes them easily visible in the network and consequently vulnerable to attacks. Encrypting of communications, both at the level of the physical layer and at the level of the session layer, for example by means of a security protocol SSL (Secure Sockets Layer) does substantially improve the security of these communications but encrypting does not modify the flow characteristics. Therefore, analysis of traffic over the network can relatively easily identify these communications and facilitate a targeted attack despite encrypting of the packets.

A subsidiary object of the present invention is consequently to improve the security of MTC communications.

DISCLOSURE OF THE INVENTION

The present invention is defined as a gateway for interfacing a capillary network of communicating devices with an access point of a cellular network, said gateway comprising:
  a plurality of input buffers designed to store packets, referred to as elementary packets, originating from the communicating devices;
  a plurality of output buffers designed to store composite packets, said composite packets being formed by aggregation of elementary packets, each output buffer being associated with a type of flow of the cellular network;
  flow regulation means determining, for each output buffer, parametering and/or transmission times of the composite packets such that the flow of these packets is consistent with the type of flow of the cellular network associated with the output buffer;
  multiplexing means for transferring and aggregating the elementary packets, stored in the input buffers, in the form of composite packets having the parameters determined by the flow regulation means;
  scheduling means for transmitting the composite packets by means of transmission resources of the cellular network.

Advantageously, the flow regulation means determine the size of the composite packets and the instants at which they must be transmitted as a function of deterministic or random parameters from a flow of the cellular network.

The type of flow of the cellular network belongs for example to a set comprising: VoIP, NRTV, http, FTP, video streaming, gaming.

According to a first variant, the multiplexing means form a composite packet by aggregating the elementary packets and complete this packet by means of dummy bits to obtain the size determined by the flow regulation means.

Alternatively, according to a second variant, the multiplexing means form a composite packet, associated with a given transmission instant, by aggregating the elementary urgent packets stored in the input buffers until the latter are exhausted or the transmission instant is reached.

In case of exhaustion of the urgent elementary packets prior to the transmission instant being reached, the multiplexing means can complete the composite packet by non-urgent elementary packets and/or dummy bits.

According to a third variant, cumulative with or alternatively to the first and second variants, the elementary packets are classified into different categories as a function of their urgency and the multiplexing means form a composite packet from elementary packets belonging to the same category.

In addition, the multiplexing means can insert a heading at the start of the composite packet indicating the respective addresses of the elementary packets aggregated in this packet.

Finally, the multiplexing means can also insert into each composite packet a flag indicating that this packet belongs to an MTC communication.

Advantageously, the gateway can also comprise a controller designed to monitor the flow of elementary packets at input and the flow of composite packets at output, and determiner for each type of flow of the cellular network, the number of output buffers linked thereto.

The scheduling means transmit the composite packets over the uplink at the respective instants determined by the flow regulation means.

The gateway can also be adapted to receive a flow of composite packets of the cellular network, decompose it into elementary packets and transmit the resulting elementary packets to the capillary network.

In a particular embodiment, the envisaged cellular network hereinabove is a 3GPP LTE network.

DETAILED EXPLANATION OF PARTICULAR EMBODIMENTS

A MTC communications system comprising a capillary network of communicating devices (sensor, detectors, counters etc. equipped for example with SIM cards), a cellular network and a MTC gateway interfacing the capillary network with an access point of the cellular network will now be considered again herein below.

The cellular network is for example a 3GPP LTE network but other types of cellular networks can be envisaged without departing from the scope of the present invention. In all cases, it is assumed that the cellular network can support different types of flow (or traffic) such as VoIP (Voice over IP), NRTV (Near Real Time Video), HTTP (HyperText Transfer Protocol), FTP (File Transfer Protocol), gaming, etc.

Of the types of flows, those are distinguished which belong to the real-time category, such as VoIP or NRTV, subject to latency constraints and those such as FTP which are simply subject to a best effort constraint.

In the case of real-time flow, each packet generally comprises time to live information or TTL (Time To Live), which gives the time at which the packet must reach its recipient at the latest. If, at any node of the network, the remaining routing time exceeds the live time, the packet is quite simply eliminated by the node in question. For instance, in a flow VoIP the maximal latency time of a packet is typically 20 ms.

In the case of a flow of "Best Effort" type, the arrival time of the packet is not critical. Therefore, a packet belonging to a flow of this type will be forwarded when all the packets available belonging to real-time flow will have been previously transmitted. In general, the different types of flows are characterised by deterministic parameters (size, periodicity or number of packets in a raster, maximal latency time for a real-time flow) or statistical parameters (packet sizes, interval between packets, number of packets within a raster etc.). A presentation of the different types of flow and their respective parameters could be found for example in the document 3GPP TSG-RAN #48, Orange et al., "R1-070674, LTE physical layer framework for performance verification", 12-16 Feb. 2007, St Louis, USA.

The basic idea of the present invention is providing flow management in the MTC gateway between the capillary network and the cellular network. This flow management aggregates the data packets originating from the capillary network so as to simulate a type of traffic existing of the cellular network, as described hereinafter.

Figure 2:
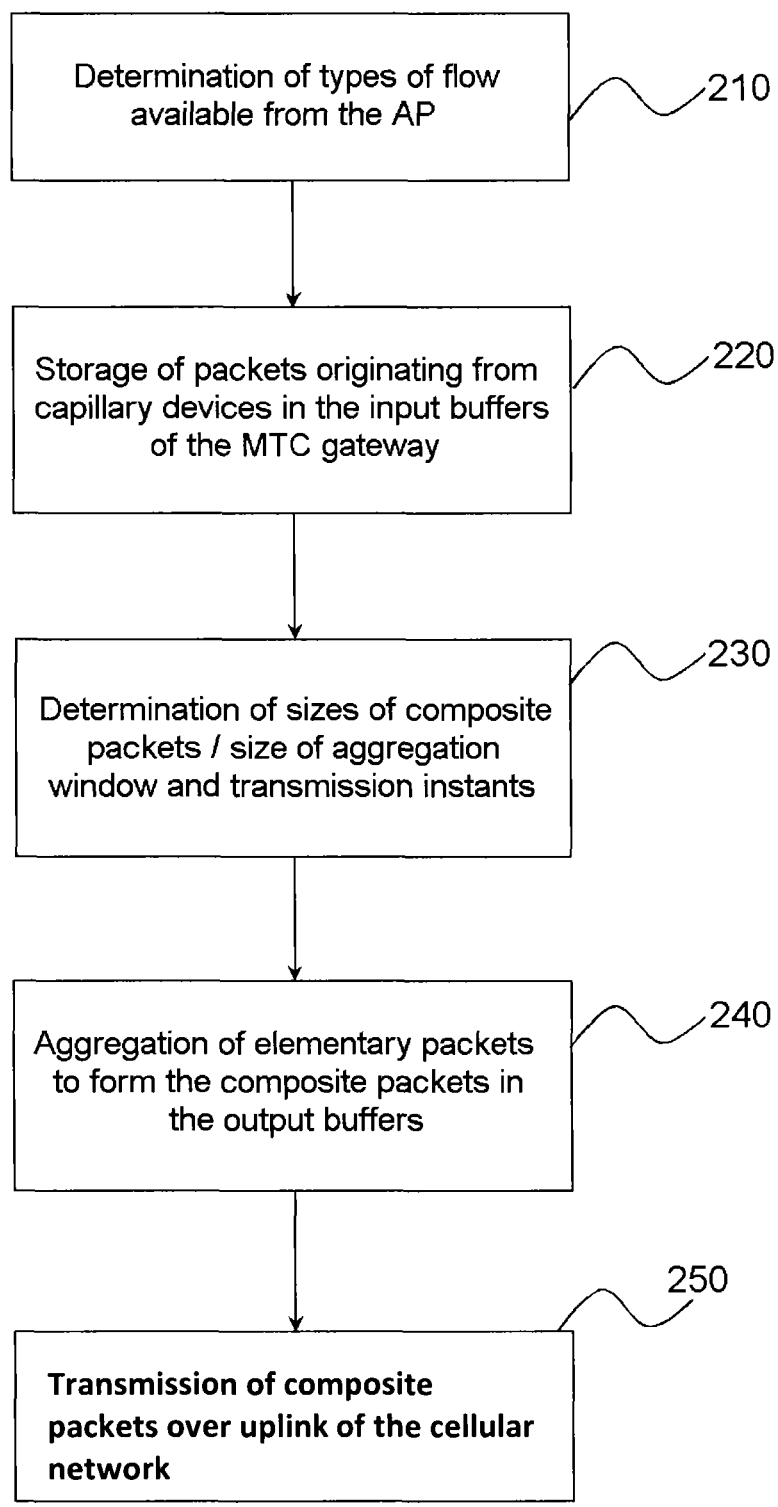
FIG. 2 illustrates an organigram of a traffic management method in a capillary gateway, according to an embodiment of the invention.

FIG. 2 illustrates an organigram of the traffic management method in a capillary gateway according to an embodiment of the invention.

In a first step 210, the MTC gateway determines a list of types of flow available to the access point of the cellular network to which it is connected. This list can be obtained by means of a specific request transmitted to the access point and can be updated at regular intervals. Alternatively, it can be the subject matter of a negotiation between the MTC gateway and the access point.

In a second step, 220, the MTC gateway receives packets originating from the different devices of the capillary network and stores them in input buffers. Each packet comprises a heading indicating the device of the capillary network which is the source thereof. The expert will understand that the input buffers can be physical buffers (registers, memory zones) or logic buffers. In this latter case, the packets are stored in a memory with a label indicating the buffer number.

In an example of embodiment, the input buffers are classified into two groups. The non-urgent packets are stored in the buffers of the first group (generally sent with low recurrence) indicating proper operation of the different devices, and the urgent packets are stored in the buffers of the second group, otherwise expressed with low latency constraint, corresponding to an alarm or the occurrence of an event. The distinction between the two types of packet can be made for example by means of reading the heading.

One or more flows is then generated, each flow being associated with an output buffer of the MTC gateway.

As will be detailed later, packets stored in the input buffers, hereinafter called elementary packets, are aggregated within a composite packet and this composite packet is stored in an output buffer.

In a third step 230, the size of the composite packet to be stored in each output buffer is determined. The size of this packet is obtained from the parameters of the flow associated with the buffer in question.

The size can be a fixed value or it can result from random drawing obeying the law of probability (of packet size) relative to the type of flow. Alternatively, the size of the composite packet can depend on the duration of an aggregation time window. In this latter case, all the packets are aggregated, or even only the packets of a certain type (real time, for example), received during this time window.

In addition, each composite packet is advantageously attributed with a transmission timestamp. This timestamp indicates at which instant the MTC gateway must transmit the packet in question to the access point. The transmission instants of the composite packets stored in an output buffer are determined from the parameters of the traffic associated with this buffer.

In a fourth step, 240, the composite packets are formed by aggregating the elementary packets stored in the input buffers. Where necessary, a heading giving the start address of each elementary packet inside the composite packet is added at the start of the composite packet. A flag can be placed in the heading to show that the packet relates to M2M communication and consequently must undergo processing particular to the reception.

The elementary packets can be for example simply concatenated to form the composite packet. Dummy bits can be also added to achieve the required packet size.

According to a first variant, the composite packet associated with the closest transmission instant is formed by aggregating urgent packets stored in the input buffers. If this aggregation does not achieve the packet size required prior to the transmission instant (optionally reduced by a safety margin), non-urgent elementary packets and/or dummy bits are used for completion.

According to a second variant, the elementary packets are aggregated category by category. For example, the elementary packets which correspond to real-time flow at low rate are all aggregated in composite packets belonging to "VoIP" flow. Similarly, all the elementary packets which correspond to real-time flow at high rate are all aggregated in composite packets belonging to flows of "video streaming" type. Finally, all the elementary packets not obeying a real-time constraint are aggregated in composite packets belonging to flows of "FTP" type.

In a final step, 250, the MTC gateway transmits the composite packets over the uplink of the cellular network, at the expected transmission instant.

Figure 1:
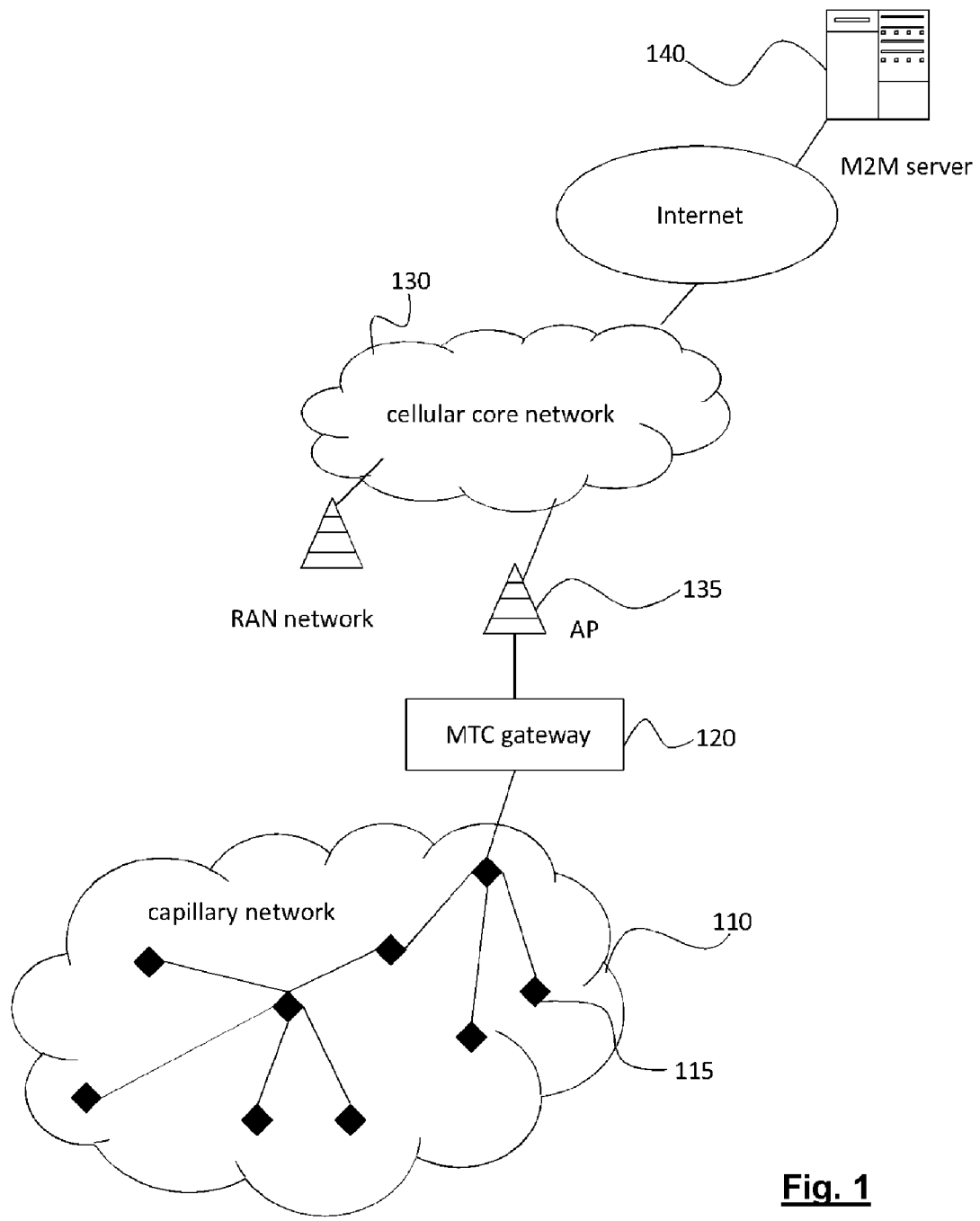
FIG. 1 already described schematically illustrates the architecture of a MTC communications system known from the prior art.
Figure 3:
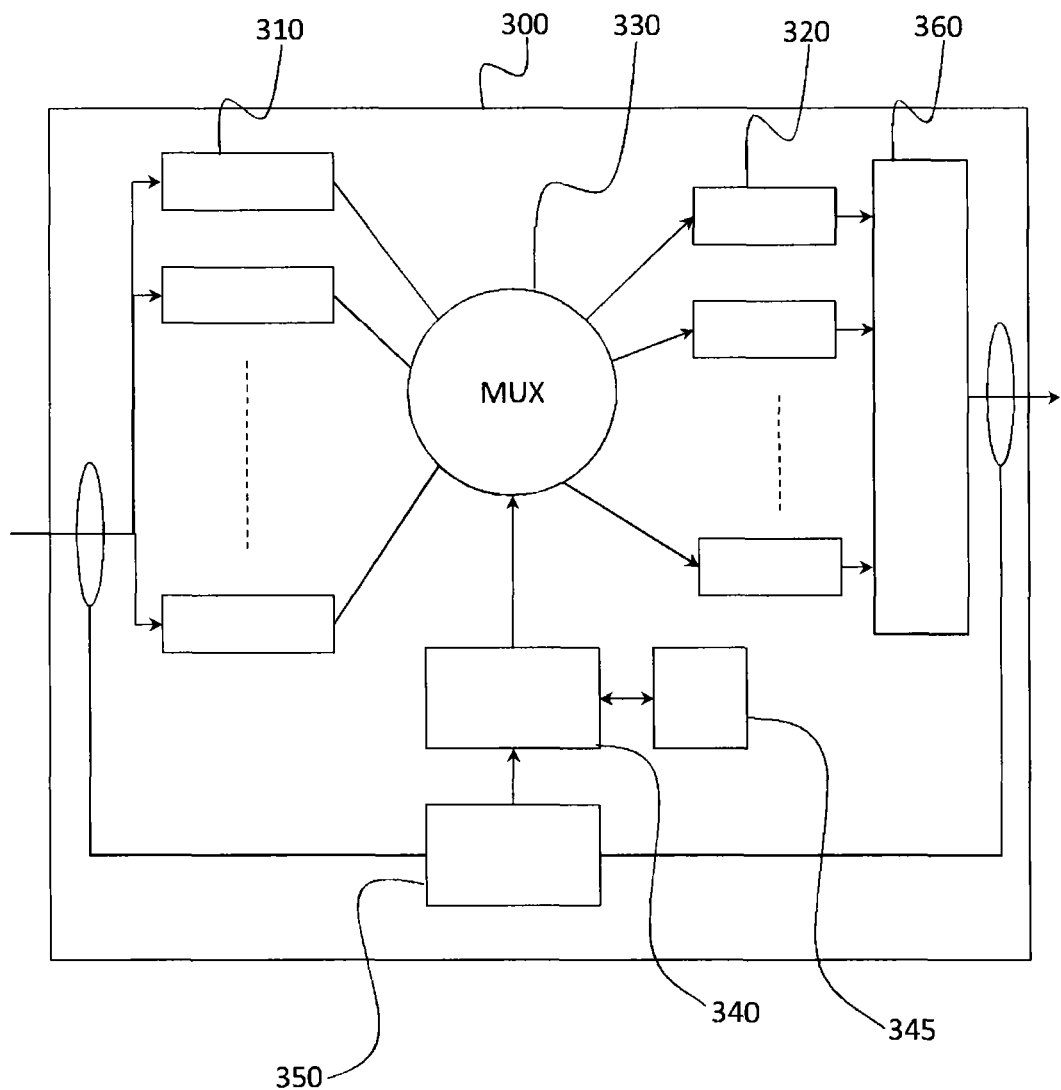
FIG. 3 illustrates a capillary gateway according to an embodiment of the invention.

FIG. 3 illustrates a MTC gateway according to an embodiment of the invention. The role of this gateway, as in FIG. 1, is to build the interface between the capillary network M2M and an access point of the cellular network.

However, contrary to the prior art, the gateway 300 conducts management of the flow of packets originating from the capillary network, in other words the traffic over the uplink.

To achieve this, the gateway comprises a plurality of input buffers, 310, which store the packets arriving from the different M2M devices. Where necessary, the input buffers are organised into different groups corresponding to different traffic categories. For instance, a first group of buffers 310 can be dedicated to real-time flow and a second group to the other flow (best effort).

The gateway 300 also comprises a plurality of output buffers, 320, each output buffer being associated with an existing type of flow of the cellular network, for example VoIP, FTP, http, video streaming, etc. It is evident that several output buffers can be associated with the same type of flow.

A multiplexer, 330, transfers the packets stored in the input buffers to the output buffers as a function of aggregation instructions provided by the traffic shaper 340. In other words, the multiplexer 330 aggregates the elementary packets to form composite packets in the sense defined earlier. Dummy bits can be also inserted into the composite packet by the multiplexer 330 to achieve the packet size determined by the traffic shaper 340. In addition, the multiplexer 330 can advantageously add a heading giving the addresses of the elementary packets within the composite packet.

The traffic shaper 340 determines the size of the composite packets and/or the width of the aggregation time window of the elementary packets. It also determines, where required, the transmission instants of the composite packets over the uplink. The size of the composite packets and the transmission instants are obtained by means of the deterministic or statistical parameters modelling the different types of traffic, stored in the table 345.

According to a first variant, the multiplexer aggregates the urgent packets stored in the input buffers (buffers of the first group). If this aggregation fails to achieve the required packet size prior to the expected transmission instant (if needed, diminished by a safety margin), the multiplexer 300 continues the aggregation process with non-urgent elementary packets and/or by completing with dummy bits.

According to a second variant, the multiplexer 330 aggregates the elementary packets category by category. For instance, the multiplexer aggregates the elementary packets corresponding to real-time flow at low rate which are aggregated in an output buffer corresponding to a flow of type VoIP. Similarly, the multiplexer aggregates the elementary packets corresponding to real-time flow at high rate in an output buffer corresponding to a flow of "video streaming" type. Finally, the multiplexer can for example aggregate all the elementary packets not obeying a real-time constraint in an output buffer or buffers corresponding to a flow of type FTP or http.

A scheduler, 360, transmits the composite packets over the transmission resources of the uplink of the cellular network (intervals of sub-carriers of an OFDM multiplex in the case of a cellular network 3GPP LTE) which are allocated to the different flow, and this at the transmission instants determined by the traffic shaper 340.

Optionally, a controller 350 monitors the flow of packets at input and the flow of composite packets at output of the gateway 300. As a function of the types of flow observed as well as of their respective rates, on the one hand, and the types of flow authorised by the access point, on the other hand, the controller determines the number of output buffers for each type, or the number of flows for each type.

For instance, if the input flows are not real time, no output buffer will be associated with a flow of type VoIP. Similarly, if the rate of the real-time input flows increases, the number of output buffers associated with a flow of VoIP type will be increased as a consequence by the controller. In addition, the controller optimises the number of output buffers for each type so as to maximise the average useful load/packet size ratio or similarly to reduce the average rate of dummy bits. Therefore, the number of buffers can vary adaptively over time.

The man skilled in the art understands that the gateway is seen by the cellular network as conventional user equipment (UE), supporting several communications in parallel (radio bearers). On the one hand this means not having to add specific types of flow for M2M communications and, on the other hand, dissimulating the characteristics of M2M flow by incorporating them into flows of existing types. Therefore, it is substantially more difficult to conduct analysis of traffic to identify M2M communications.

The gateway itself can receive a flow of composite packets over the downlink, for example from a second gateway interfacing another capillary network with the cellular network (gateway-to-gateway-communication). In this case, the gateway decomposes each composite packet of this flow into elementary packets, then transmits it to the capillary network which has to route it to a destination, as a function of their respective identifiers. Decomposition into elementary packets is done from the addresses of these packets in the heading of the composite packet. Where necessary, decomposition into elementary packets is carried out only to the extent where the gateway detects a flag indicating that the received packet is a composite packet.

The invention claimed is:

1. A gateway for interfacing a capillary network, which is a machine-type communications (MTC) network, of communicating devices with an access point of a cellular network, said gateway comprising:
   a plurality of input buffers configured to store elementary MTC packets originating from the communicating devices;
   a plurality of output buffers configured to store composite packets, said composite packets being formed by aggregation of elementary MTC packets, each output buffer being associated with a type of flow of the cellular network which is not used in the capillary network;
   a traffic shaper that determines, for each output buffer, parameters of size and/or transmission times of the composite packets such that the flow of said composite packets is consistent with the type of flow of the cellular network associated with the output buffer;
   a multiplexer that transfers and aggregates elementary MTC packets, stored in the input buffers, in the form of composite packets having the parameters determined by the traffic shaper;
   a scheduler that transmits the composite packets by transmission resources of the cellular network.

2. The gateway according to claim 1, wherein the traffic shaper determines the size of composite packets and instants at which the composite packets must be transmitted as a function of deterministic or random parameters of flow of the cellular network.

3. The gateway according to claim 1, wherein the type of flow of the cellular network belongs to a group consisting of: VoIP, NRTV, http, FTP, video streaming, and gaming.

4. The gateway according to claim 1, wherein the multiplexer forms a composite packet by aggregating elementary MTC packets and completes said composite packet by dummy bits to obtain the size determined by the traffic shaper.

5. The gateway according to claim 1, wherein the multiplexer forms a composite packet, associated with a given transmission instant, by aggregating elementary urgent MTC packets stored in the input buffers until the input buffers are exhausted or the transmission instant has been reached.

6. The gateway according to claim 5, wherein, in the event of exhaustion of the urgent MTC elementary packets prior to the transmission instant being reached, the multiplexer completes the composite packet by non-urgent elementary packets and/or dummy bits.

7. The gateway according to claim 1 wherein the elementary MTC packets are classified into different categories as a function of their urgency and the multiplexer forms a composite packet from elementary MTC packets belonging to the same category.

8. The gateway according to claim 1, wherein the multiplexer inserts a header at the start of the composite packet indicating respective addresses of the elementary MTC packets aggregated in this packet.

9. The gateway according to claim 1 wherein the multiplexer inserts into each composite packet a flag indicating that this packet belongs to a MTC communication.

10. The gateway according to claim 1, further comprising a controller that monitors the flow of elementary MTC packets at input and the flow of composite packets at output, and determine for each type of flow of the cellular network the number of output buffers which are associated therewith.

11. The gateway according to claim 2, wherein the scheduler transmits the composite packets over an uplink at the respective instants determined by the traffic shaper.

12. The gateway according to claim 1, wherein said gateway is adapted to receive a flow of composite packets of the cellular network, decompose the flow of composite packets of the cellular network into elementary MTC packets and transmit the resulting elementary MTC packets to the capillary network.

13. The gateway according to claim 1, wherein the cellular network is a 3GPP LTE network.

14. A method, implemented by a gateway for interfacing a capillary network, which is a machine-type communications (MTC) network, of communicating devices with an access point of a cellular network, said method comprising:
   storing, by a plurality of input buffers, elementary MTC packets originating from the communicating devices;
   storing, by a plurality of output buffers, composite packets, said composite packets being formed by aggregation of elementary MTC packets, each output buffer being associated with a type of flow of the cellular network which is not used in the capillary network;
   determining for each output buffer, parameters of size and/or transmission times of the composite packets such that the flow of said composite packets is consistent with the type of flow of the cellular network associated with the output buffer;
   transferring and aggregating elementary MTC packets, stored in the input buffers, in the form of composite packets having the determined parameters;
   transmitting the composite packets by transmission resources of the cellular network.

15. The gateway according to claim 1, wherein the plurality of output buffers includes an output buffer associated with one of a VoIP, NRTV, http, FTP, video streaming, and gaming flow of the cellular network, while the elementary MTC packets stored in the output buffer are not originally identified in the capillary network as VoIP, NRTV, http, FTP, video streaming, or gaming traffic flows.

16. The gateway according to claim 1, wherein elementary MTC packets which correspond to a real-time flow at a low rate are aggregated into composite packets which are stored in an output buffer associated with a VoIP flow in the cellular network, elementary MTC packets which correspond to a real-time flow at a high rate are aggregated into composite packets which are stored in an output buffer associated with a video streaming flow in the cellular network, and elementary MTC packets which do not include real-time data are aggregated into composite packets which are stored in an output buffer associated with a FTP flow in the cellular network.

* * * * *